US 8,326,380 B2

(12) United States Patent
Kaneoya (10) Patent No.: US 8,326,380 B2
(45) Date of Patent: Dec. 4, 2012

(54) FOLDABLE PORTABLE WIRELESS COMMUNICATION APPARATUS

(75) Inventor: Masanori Kaneoya, Musashimurayama (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1160 days.

(21) Appl. No.: 11/489,988

(22) Filed: Jul. 20, 2006

(65) Prior Publication Data

US 2007/0021159 A1 Jan. 25, 2007

(30) Foreign Application Priority Data

Jul. 21, 2005 (JP) ................................. 2005-211695
Mar. 28, 2006 (JP) ................................. 2006-088117

(51) Int. Cl.
*H04M 1/00* (2006.01)
*H04Q 1/24* (2006.01)
(52) U.S. Cl. ..................... 455/575.3; 455/90.3; 343/702
(58) Field of Classification Search .................. 455/90.2, 455/90.3, 347, 575.1, 575.3; 343/702, 718, 343/700 MS, 906
See application file for complete search history.

(56) References Cited

U.S. PATENT DOCUMENTS

| 6,346,925 B1 * | 2/2002 | Matsumoto | 343/895 |
| 6,603,431 B2 * | 8/2003 | Talvitie et al. | 343/702 |
| 6,677,907 B2 * | 1/2004 | Shoji et al. | 343/702 |
| 7,068,228 B2 * | 6/2006 | Soutome | 343/702 |
| 7,130,591 B2 * | 10/2006 | Iwai et al. | 455/90.3 |
| 7,526,326 B2 * | 4/2009 | Vance et al. | 455/575.7 |
| 2005/0239519 A1* | 10/2005 | Saitou et al. | 455/575.1 |

FOREIGN PATENT DOCUMENTS

| JP | 2004-186970 | 7/2004 |
| JP | 2004-229048 | 8/2004 |
| JP | 2004-297535 | 10/2004 |
| JP | 2005-057664 | 3/2005 |
| JP | 2005-136668 | 5/2005 |

* cited by examiner

*Primary Examiner* — Quochien B Vuong
(74) *Attorney, Agent, or Firm* — Cozen O'Connor (57) ABSTRACT

A foldable portable wireless communication apparatus which ensures miniaturization of housing and good antenna characteristic has first casing including transmitter and/or operation section, and second housing including receiver and/or display section and rotatably linked with the first casing through hinge section provided on one end portion of the first housing on the front face side thereof. An antenna board is provided in area at back of the hinge section inside the first housing, and a circuit board having a radio-frequency circuit section mounted thereon is provided in area not overlapping the hinge section inside the first housing. A connection conductor connecting the antenna board and the high frequency wave input/output point of the radio-frequency circuit section is configured into a monopole antenna by setting the direction of extension of the connection conductor in the lengthwise direction of the first housing in the vicinity of the high frequency wave input/output point.

11 Claims, 7 Drawing Sheets

FOLDABLE PORTABLE WIRELESS COMMUNICATION APPARATUS

BACKGROUND OF THE INVENTION

1. Field of the Invention

The present invention relates to a foldable portable wireless communication apparatus, and more particularly, a foldable portable wireless communication apparatus which has a built-in antenna.

2. Description of the Related Art

Cellular phones become very popular as foldable portable wireless communication apparatuses. Some of such cellular phones incorporate an antenna in a casing, i.e., they have a built-in antenna.

For example, in a foldable cellular phone disclosed in Unexamined Japanese Patent Application KOKAI Publication No. 2004-297535, an operation-side housing provided with a transmitter microphone, a key operation section, and the like extends upward beyond a hinge section provided on one end portion of the anterior surface of the housing. The foldable cellular phone employs a structure that an antenna is housed in an area extending from below the hinge section to an extended part of the operation-side housing.

As the foldable cellular phone disclosed in Unexamined Japanese Patent Application KOKAI Publication No. 2004-297535 is structured to house the antenna behind the hinge section, the foldable cellular phone is unlikely to be affected by a human body at the time of talking, and is superior in terms of high packing density of parts.

In the case of the structure of the foldable cellular phone disclosed in Unexamined Japanese Patent Application KOKAI Publication No. 2004-297535, however, when a display-side housing is folded toward the operation-side housing, the antenna housing portion of the operation-side housing protrudes upwardly beyond the hinge section. Accordingly, the foldable cellular phone is not preferable in design, and has not achieved sufficient miniaturization of the casing.

In a case where a protrusive portion is not provided, as an antenna housing section is shortened in the lengthwise direction of the housing, the built-in antenna should be shortened in the lengthwise direction by what corresponds to the shortened length of the antenna housing section. Therefore, the structure having no protrusive portion is brings about a disadvantage that the gain of a vertical polarization component at the built-in antenna decreases.

SUMMARY OF THE INVENTION

The present invention is made in view of the aforementioned circumstance, and it is an object of the invention is to provide a foldable portable wireless communication apparatus which ensures miniaturization of a casing and a good antenna characteristic.

To achieve the object, a foldable portable wireless communication apparatus of the invention comprises:

a first housing having at least one of a transmitter and an operation section;

a second housing which has at least one of a receiver and a display section, and is rotatably linked with the first housing through a hinge section provided on one end portion of the first housing on a front face side thereof;

a first antenna element provided in an area which is a back of the hinge section inside the first housing;

a circuit board provided in an area not overlapping the hinge section inside the first housing, and having a radio-frequency circuit section mounted thereon; and a connection conductor which connects the first antenna element and a high frequency wave input/output point of the radio-frequency circuit section on the circuit board, extends along a lengthwise direction of the first housing in the vicinity of the high frequency wave input/output point, and is so configured into a monopole antenna as a second antenna element.

The connection conductor constitutes a quarter-wave antenna together with the first antenna element.

Each of electrical lengths of the first antenna element and the connection conductor is approximately one-eighth of a wavelength in a communication band.

The first antenna element is a linear antenna element.

The first antenna element is a modified monopole antenna.

The first antenna element is a thin planar antenna element.

The first antenna element is formed on a printed board.

The connection conductor comprises a metal plate.

The metal plate is integrally molded with a resin by insert molding.

According to the invention, it is not necessary to provide a protrusive portion on the side end portion of the hinge section, thus miniaturizing a housing. A shortfall of a gain of a vertical polarization component by the first antenna element miniaturized as a built-in antenna is complemented by the connection conductor which is configured into a monopole antenna as the second antenna element, and connects the first antenna element and the high frequency wave input/output point of the radio-frequency circuit section on the circuit board, thus improving an antenna characteristic.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A best mode for carrying out the invention will be elaborated with reference to the accompanying drawings.

Figure 1:
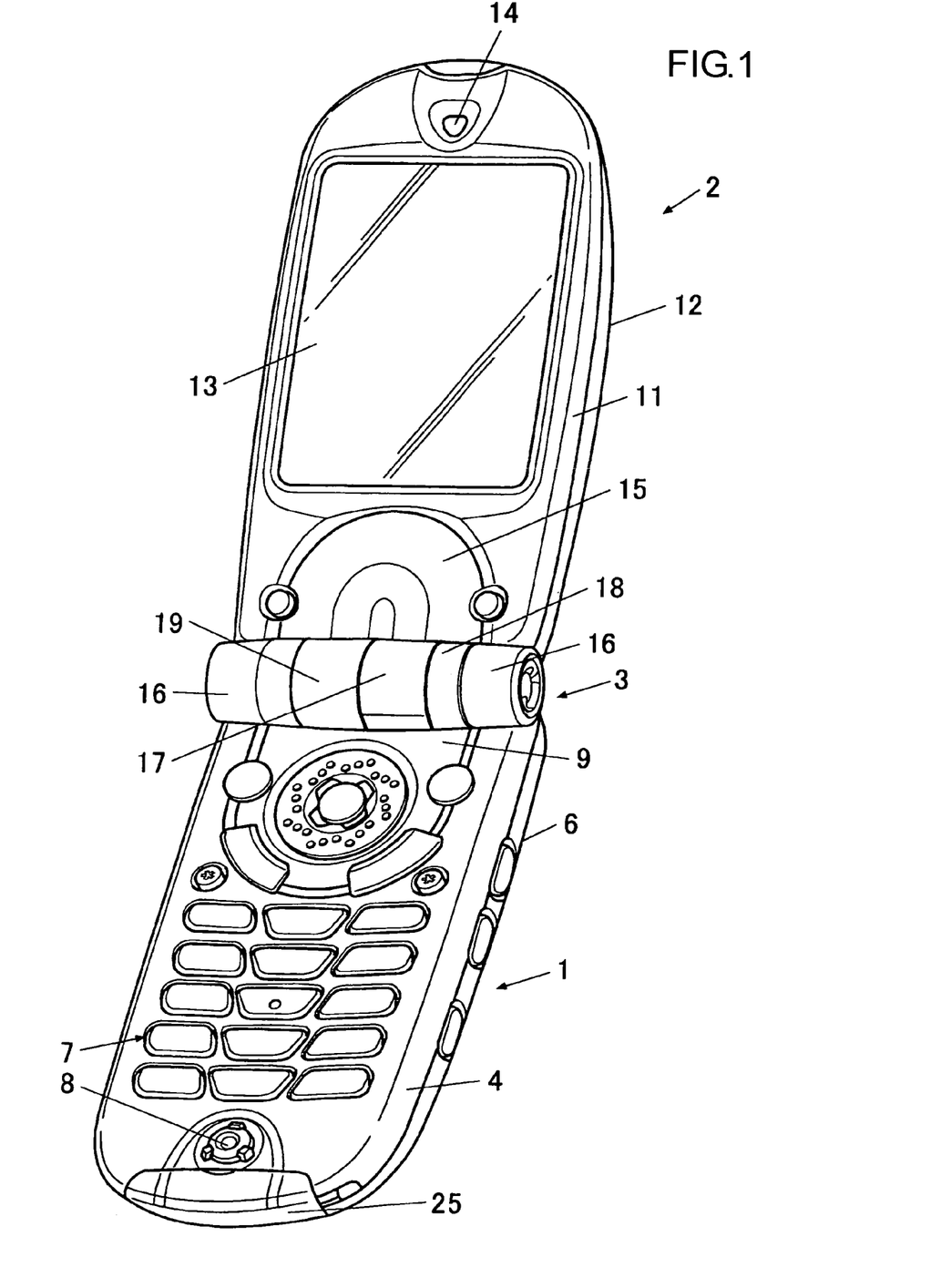
FIG. 1 is a perspective view illustrating the structure of a foldable cellular phone as a folding portable wireless communication apparatus to which the invention is applied according to one embodiment, as viewed from the front side with the cellular phone opened.

FIG. 1 illustrates a foldable cellular phone as an embodiment of a foldable portable wireless communication apparatus to which the invention is applied opened. A first housing 1 and a second housing 2 are rotatably linked with each other by a hinge section 3.

The first housing 1 is constituted by combining a top casing 4, a bottom casing 5 (see FIGS. 2 and 3) and a bottom cover 6. The first housing 1 has various key switches (operation section) 7, a microphone (transmitter) 8, and a key top plate 9 provided on the top casing 4 which overlaps the second housing 2 in a folded state.

The second housing 2 is constituted by combining a top casing 11 and a bottom casing 12. The second housing 2 has a liquid crystal display screen (display section) 13, a receiver 14 and a logo plate 15 provided on the top casing 11 which overlaps the first housing 1 in a folded state.

Figure 3:
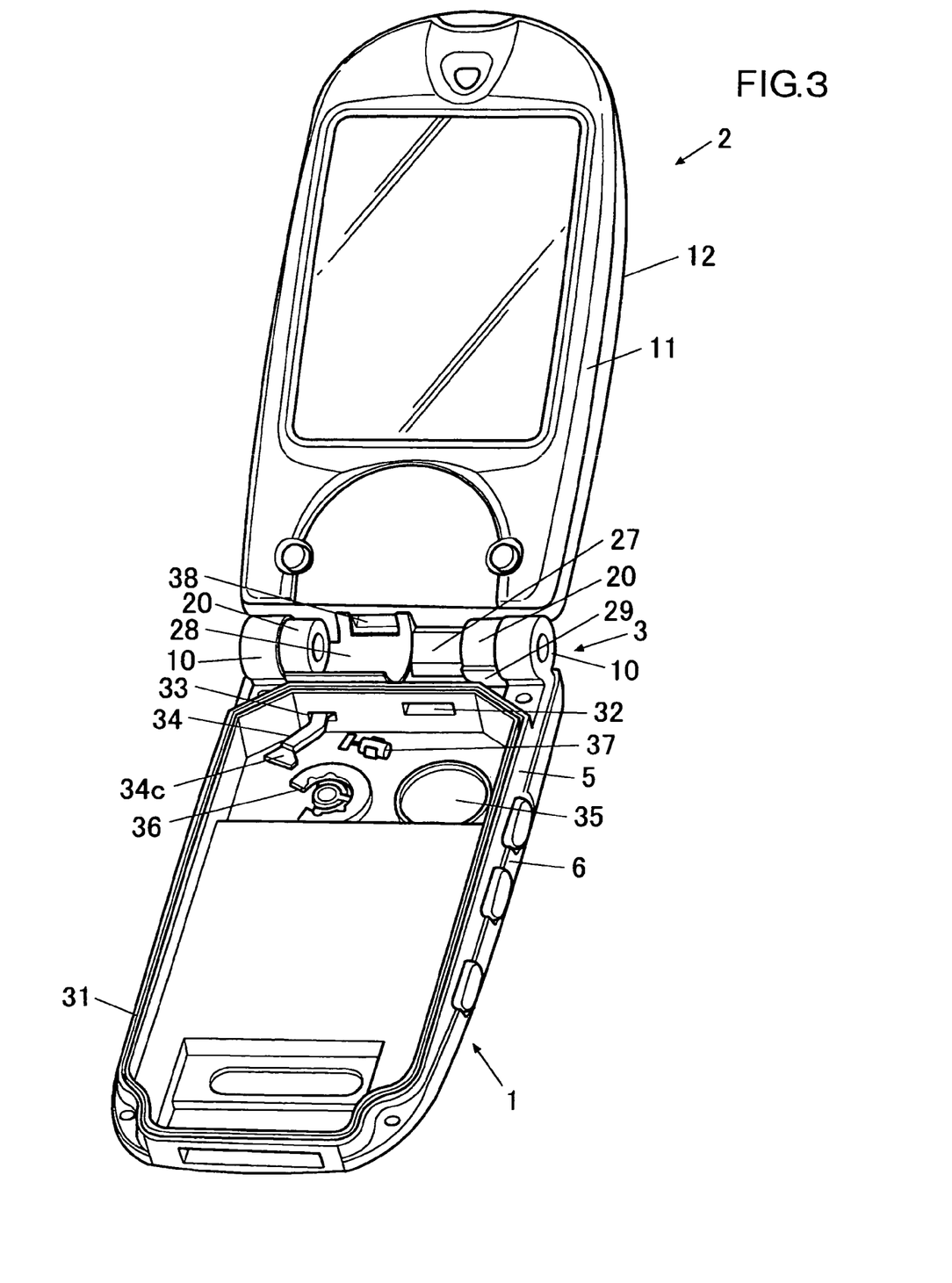
FIG. 3 is a perspective view illustrating a front cover (top casing) of an operation-side unit (first housing), hinge caps, hinge covers, internal modules, and the like removed in the open state of FIG. 1.

As illustrated in FIG. 3, the hinge section 3 has brackets 10, 10 provided on the bottom casing 5 of the first housing 1 and brackets 20, 20 provided on the bottom casing 12 of the second housing 2 and interlined with the respective brackets 10, 10 by a hinge unit. Each of the outward brackets 10, 10 is covered with a hinge cap 16. A portion between the hinge caps 16, 16 is covered by a pair of a hinge cover 17 integral with the key top plate 9 and a hinge cover 27 attached to the bottom casing 5 of the first housing 1 (see FIG. 3), and pairs of hinge covers 18, 19 integral with the logo plate 15 and respective hinge covers 28, 29 attached to the bottom casing 12 of the second housing 2 (see FIG. 3).

Figure 2:
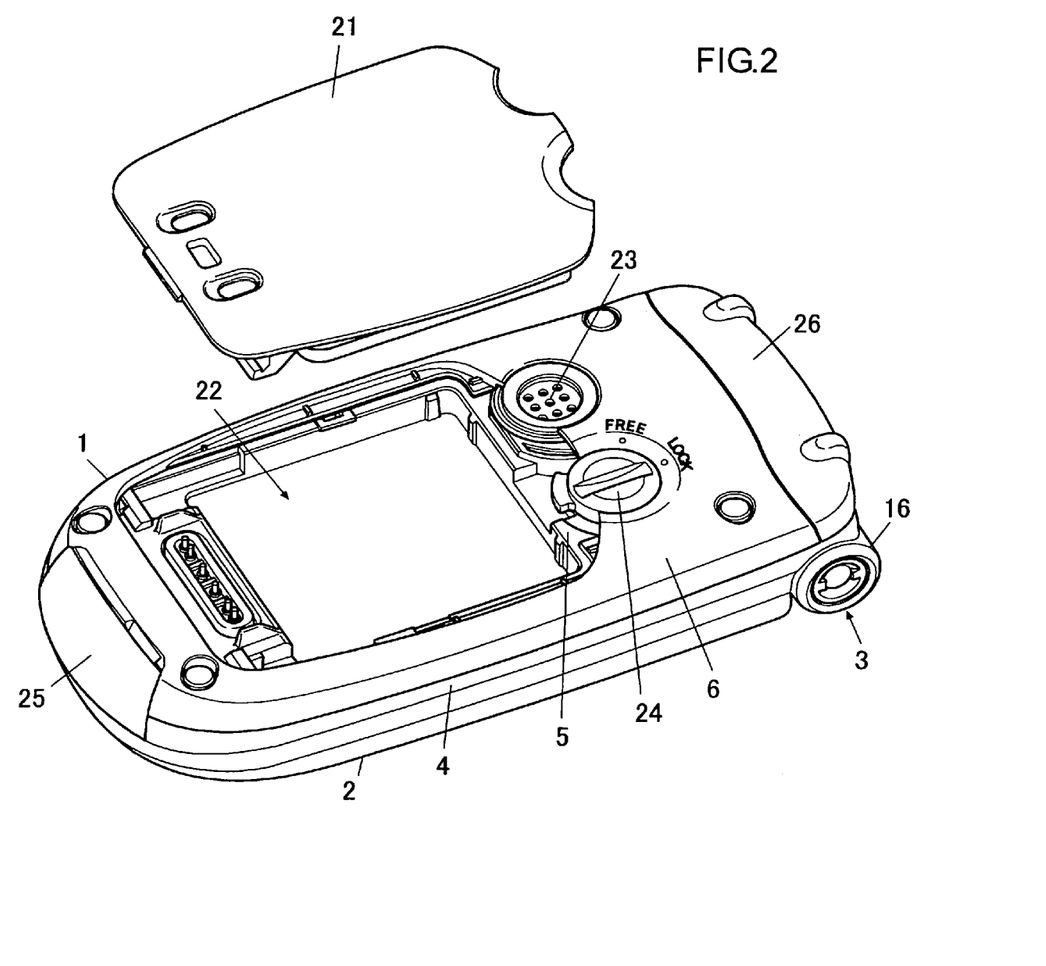
FIG. 2 is an exploded perspective view illustrating a foldable cellular phone closed as viewed from the rear side, and is an exploded view with a battery unit removed.

FIG. 2 illustrates a disassembly state where a battery unit 21 is removed with the foldable cellular phone closed as viewed from the rear side. A battery housing section 22 which is for loading the battery unit 21 is formed on the bottom casing 5 and the bottom cover 6 of the fast housing 1. A speaker 23, a battery attachment/detachment operation lever 24, a connector cover 25, and an antenna cover 26 are assembled with the bottom casing 5 and the bottom cover 6.

FIG. 3 illustrates the logo plate 15 which is integral with the hinge covers 18, 19, the key top plate 9 which is integral with the hinge cover 17, the hinge caps 16, the top casing 4 of the first housing 1, the connector cover 25, internal modules, and the like removed in the open state of FIG. 1. The hinge cover 27 is attached to the bottom casing 5 of the first housing 1, and the hinge covers 28, 29 are attached to the bottom casing 12 of the second housing 2. The hinge covers 28, 29 are integral with each other.

As illustrated in the figure, a packing groove 31 is formed around the bottom casing 5 of the first housing 1. A hole 32 for an FPC and a hole 33 for an antenna are formed in the left and right of the end surface of the hinge section 3 side of the bottom casing 5, respectively, and the one end side of an antenna connection conductor 34 fitted into the antenna hole 33 protrudes therefrom.

A speaker attachment section 35 is provided inside the bottom casing 5. A lock mechanism 36 which operates together with the battery attachment/detachment operation lever 24 and holds the battery unit 21 (see, FIG. 2) in a loaded state, and a vibrator 37 for incoming announcement are assembled inside the bottom casing 5.

A hole 38 for an FPC is formed in the end surface of the hinge section 3 side of the bottom casing 12 of the second housing 2.

Figure 4:
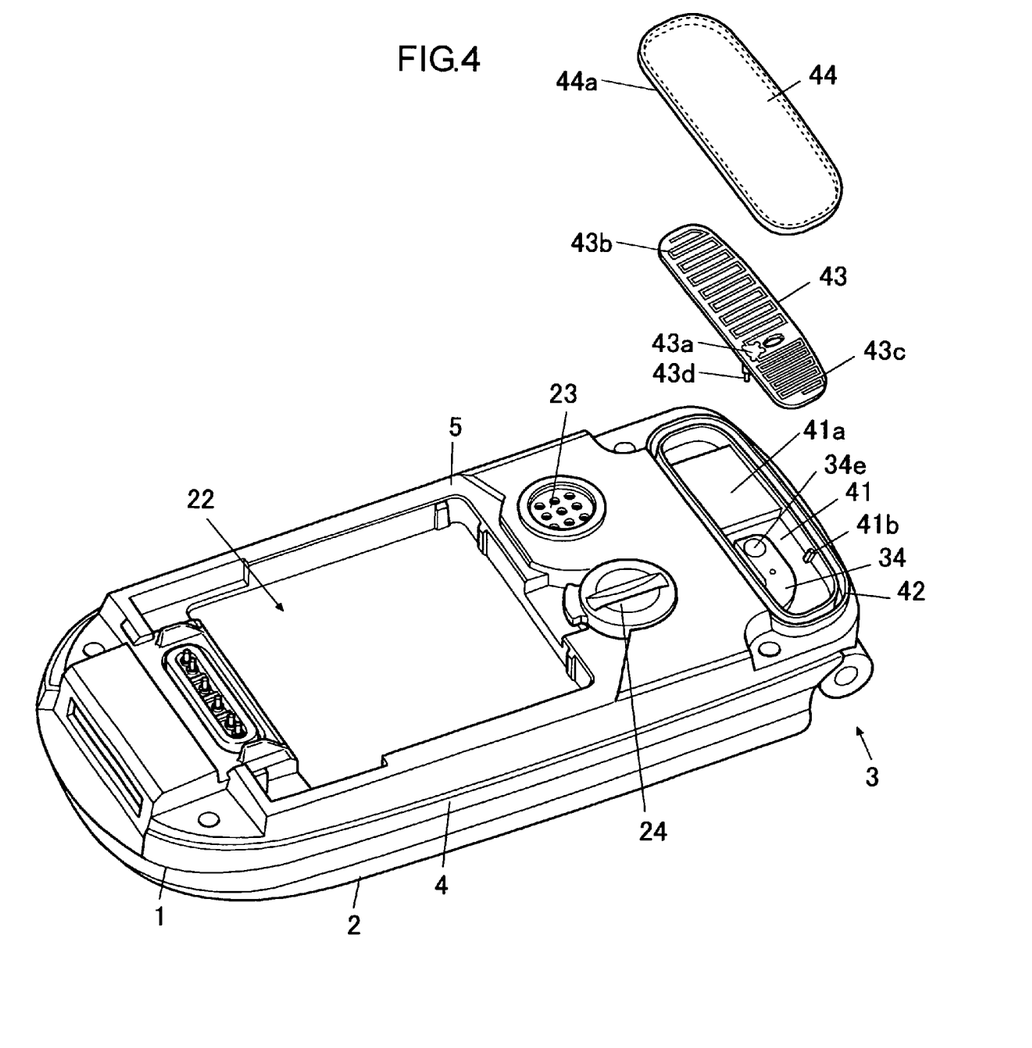
FIG. 4 is an explanatory perspective view of the structure of an antenna section illustrating the battery unit of the operation-side unit, a rear cover (bottom cover), the hinge caps, and the like removed in the close state of FIG. 2.

FIG. 4 is for explaining the structure of an antenna section with the battery unit 21, the bottom cover 6 of the first housing 1, the hinge caps 16, the antenna cover 26 and the like removed in the close state of FIG. 2.

As illustrated in the figure, an antenna housing recess portion 41 is formed along the end portion of the hinge section 3 side behind the hinge section 3. The antenna hole 33 (see, FIG. 3) reaches the antenna housing recess portion 41. Therefore, the other end section of the antenna connection conductor 34 protrudes inside the antenna housing recess portion 41.

As illustrated in FIG. 4, inside the antenna housing recess portion 41, an antenna board fixing surface 41*a* is formed on the left, and a rib 41*b* for holding the antenna board is formed on the right. The antenna board fixing surface 41*a* and the antenna board holding rib 41*b* have the same height, and an antenna board 43 is mounted on the antenna board fixing surface 41*a* and the antenna board holding rib 41*b*.

A packing groove 42 is formed around the antenna housing recess portion 41. An antenna packing (waterproof cover) 44 is fitted into the packing groove 42.

As illustrated in the figure, the antenna board 43 has a meander line linear antenna patterned on a rigid board (a hard printed board). That is, an electrode 43*a* for power feeding is formed on the antenna board 43, and meander line antenna elements 43*b*, 43*c* made by patterning copper films are formed on the right and the left of the feeding electrode 43*a*.

In FIG. 4, the meander line antenna element 43*b* on the left is for communication, and the meander line antenna element 43*c* on the right is for GPS (Global Positioning System). Both antenna elements 43*b*, 43*c* are modified monopole antennas. The antenna elements 43*b*, 43*c* are thin planer monopole antennas.

The antenna board 43 integrally has a spring connector 43*d* which protrudes from the feeding electrode 43*a* to the opposite side.

The antenna packing 44 works as a waterproof cover, and has a seal lip section 44*a* therearound.

Figure 7A:
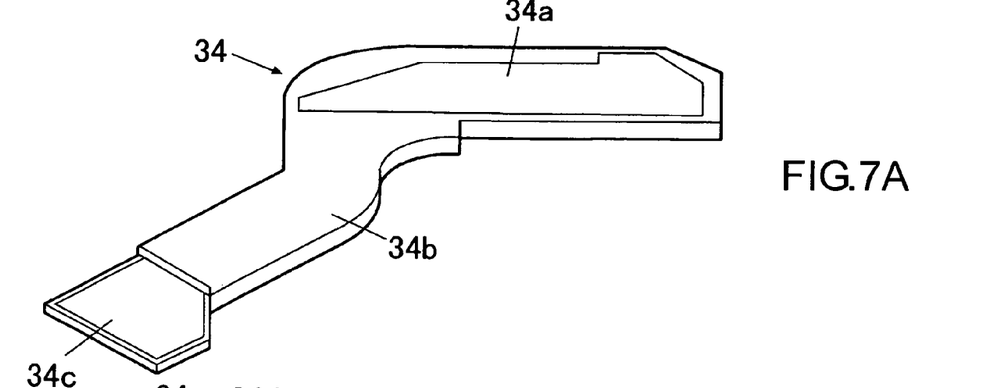
FIG. 7A is a perspective view illustrating an antenna connection conductor (part) as viewed from the same direction as that of FIG. 3.

As illustrated in FIG. 7A, the antenna connection conductor 34 is structured by molding a metal plate 34*a* with a resin 34*b*. More specifically, the antenna connection conductor 34 is structured as a molded piece that the metal plate 34*a* is inserted in the resin 34*b* by insert molding.

Figure 7B:
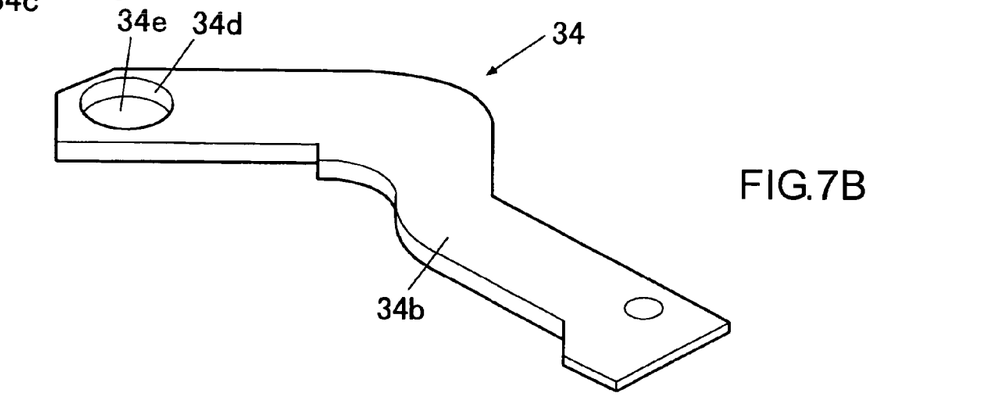
FIG. 7B is a perspective view illustrating the antenna connection conductor (part) as viewed from the same direction as that of FIG. 4.

In the embodiment, the antenna connection conductor 34 is formed in an approximately L shape as illustrated in the figure, and the one end portion thereof has a circuit board side connection terminal 34*c* exposing the metal plate 34*a* (see FIG. 7A). As illustrated in FIG. 7B, a small hole 34*d* is formed in the other end portion opposite to the circuit board side connection terminal 34*c* of the mold resin 34*b*, and a portion of the metal plate 34*a* exposed in the small hole 34*d* is an antenna board connection terminal 34*e*.

Next, how to assemble the antenna connection conductor 34 and the antenna board 43 will be explained.

The antenna connection conductor 34 is inserted into the antenna hole 33 from the interior of the bottom casing 5 of the first housing 1 with the antenna board side connection terminal 34*e* being a leading end of the insertion. Accordingly, as illustrated in FIG. 3, the circuit board side connection terminal 34*c* side of the antenna connection conductor 34 is located at the side of the vibrator 37. As illustrated in the figure, the circuit board side connection terminal 34*c* is, however, located at a place away from the vibrator. As illustrated in FIG. 4, the antenna board side connection terminal 34e side of the antenna connection conductor 34 is located in the antenna housing recess portion 41. The antenna board side connection terminal 34e is located near the antenna board fixing surface 41a as illustrated in the figure.

Next, the antenna board 43 is inserted into the antenna housing recess portion 41. With the spring connector 43d being connected to the antenna board side connection terminal 34e, the antenna element 43b side of the antenna board 43 is bonded to the antenna board fixing surface 41a by a double-sided tape or the like. At this time, the antenna element 43c side of the antenna board 43 is supported by the antenna board holding rib 41b.

Subsequently, the seal lip section 44a around the antenna packing 43 is fitted into the packing groove 42 around the antenna housing recess portion 41. The antenna housing recess portion 41 is covered by the antenna packing 43 for waterproofing.

Figure 5:
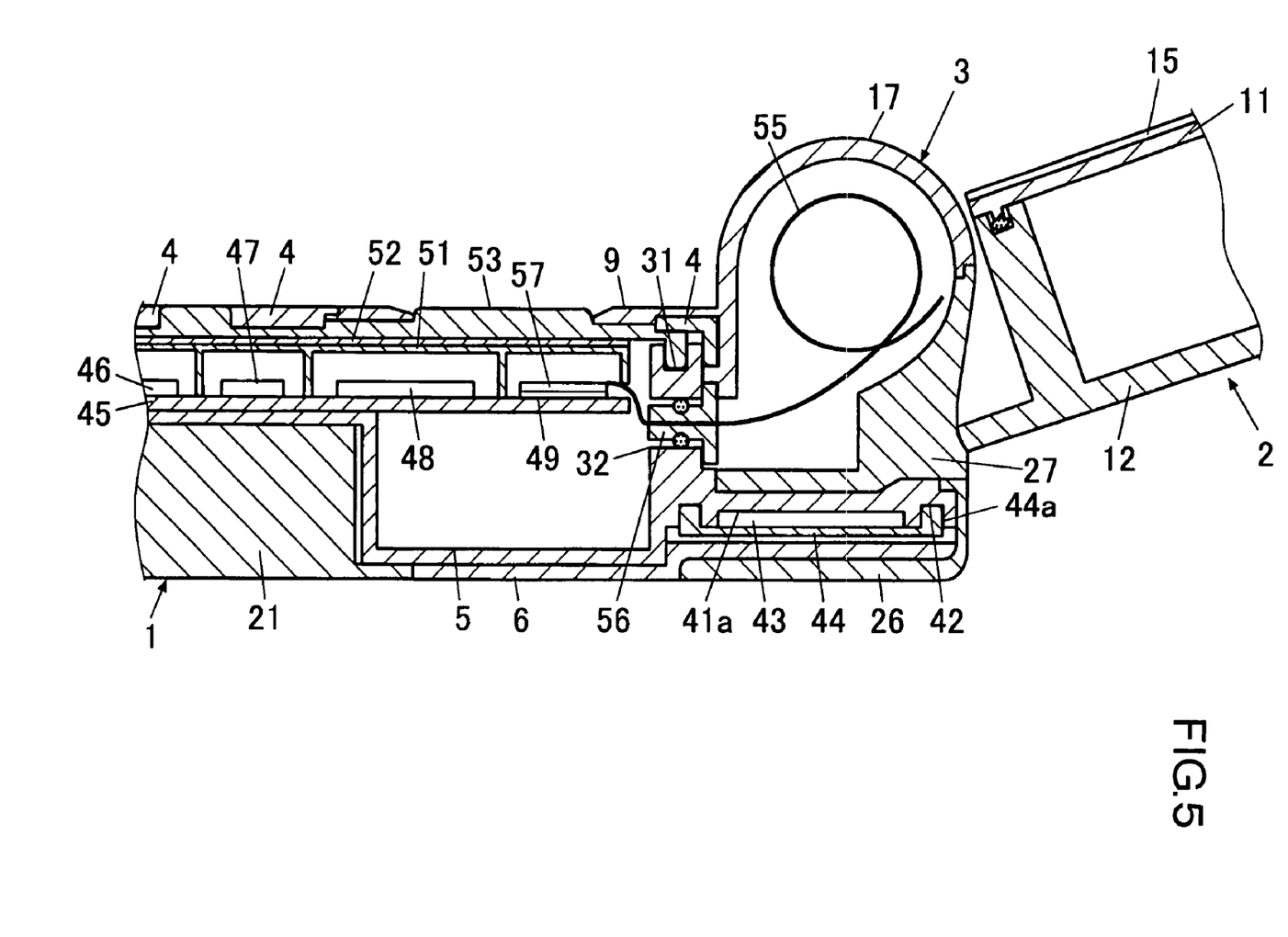
FIG. 5 is a cross-sectional view illustrating the cross-sectional structure of a hinge section side, and illustrating an area covered by the hinge cover integrated with a key top plate.
Figure 6:
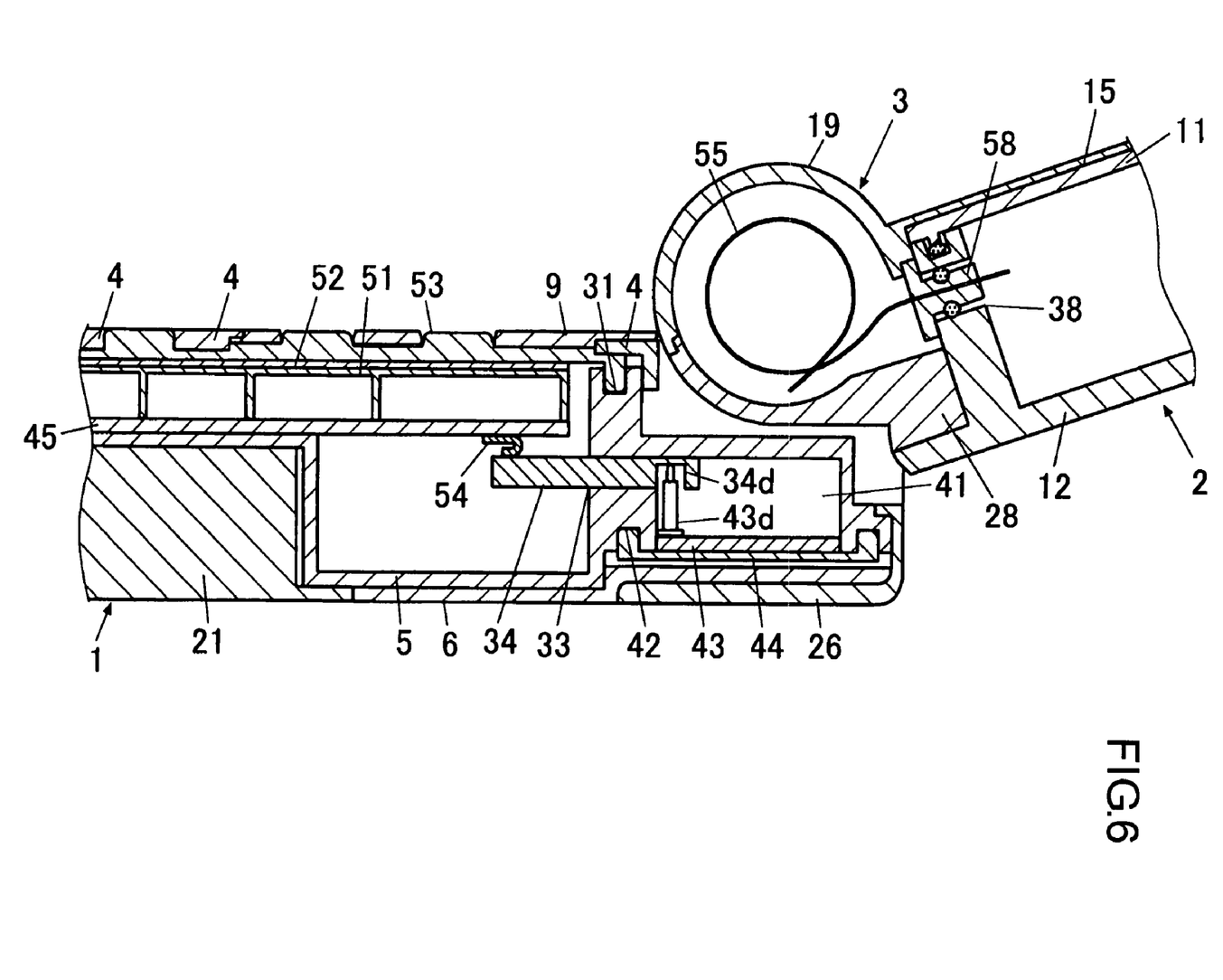
FIG. 6 is a cross-sectional view illustrating the cross-sectional structure of the hinge section side, and illustrating the area covered by the hinge cover integrated with the key top plate.

FIGS. 5 and 6 illustrate the cross-sectional structure of the hinge section 3 side. As illustrated in FIGS. 5 and 6, the foldable cellular phone further has a circuit board 45, electronic parts 46, 47, and 48, a connector 49, a module frame (sealed casing) 51, a sheet key 52, a key pad 53, a contact point spring 54, a flexible wiring board (FPC) 55, a waterproof cap 56, a connector 57, and a waterproof cap 58. As illustrated in the figure, a seal lip section around the key pad 53 is fitted into the packing groove 31 of the bottom casing 5.

As illustrated in FIG. 6, inside the first housing 1 (bottom casing 5), the circuit board side connection terminal 34c of the antenna connection conductor 34 (see, FIGS. 3 and 7) is connected to the high frequency wave input/output point of a radio-frequency circuit section mounted on the circuit substrate 45, i.e., a feeding point for the antenna through the contact point spring 54.

As illustrated in the figure, the FPC 55 is provided in a space covered by the hinge covers 17, 27, and the like. The FPC 55 connects the circuit board 45 in the first housing 1 (bottom casing 5) and a circuit board in the second housing 2 (bottom casing 12) with each other.

That is, the one end side of the FPC is led to the interior of the first housing 1 (bottom casing 5) through the FPC hole 32 as illustrated in FIG. 5. The connector 57 is provided on the leading end of the one end side of the FPC 55, and connected to the connector 49 on the circuit board 45. The FPC hole 32 is sealed by the waterproof cap 56 which is integrally attached to the FPC 55.

As illustrated in FIG. 6, the other end side of the FPC 55 is led to the interior of the second housing 2 (bottom casing 12) through the FPC hole 38. It is not illustrated, but a connector is provided on the leading end of the other end side of the FPC 55. The other end side of the FPC 55 is connected to the circuit board through the non-illustrated connector in the second housing 2 (bottom casing 12). The FPC hole 38 is sealed by the waterproof cap 58 integrally attached to the FPC 55.

As mentioned above and illustrated in FIGS. 4 to 6, in the embodiment, the antenna board 43 is disposed behind the hinge section 3.

The antenna on the antenna board 43, i.e., the linear antenna elements 43b, 43c are located on a surface away from the hinge section 3 of the antenna board 43 (i.e., a surface opposite to the hinge section 3 side) to reduce the affection from the FPC 55 (more specifically, the affection of an electromagnetic wave emitted from the FPC 55 and becoming a noise).

The linear antenna elements 43b, 43c on the antenna board 43 are connected to the high frequency wave input/output point (feeding point) of the radio-frequency circuit section mounted on the circuit board 45 through the antenna connection conductor 34.

That is, as illustrated in FIGS. 7A and 7B, the antenna connection conductor 34 is formed in an approximately L shape, and the antenna board side connection terminal 34e is disposed behind the hinge section 3, and is connected to the spring connector 43d (see, FIGS. 4 and 6) of the antenna board 43. The circuit board side connection terminal 34c side of the antenna connection conductor 34 passes through the antenna hole 33 formed in a partition wall which divides off the hinge section 3 and the first housing 1 (bottom casing 5) housing the circuit board 45 and the like (also works as the peripheral wall of the antenna housing recess portion 41), and runs into the first housing 1 (bottom casing 5). The circuit board side connection terminal 34c of the antenna connection conductor 34 running into the first housing 1 is connected to the contact point spring 54 provided on the circuit board 45 (see, FIGS. 3 and 6). The contact point spring 54 is connected to the radio-frequency circuit section mounted on the circuit board 45, and functions as the input/output point of a high frequency wave (feeding point for the antenna).

In such a structure, an antenna current which flows through the antenna connection conductor 34 becomes maximum near the feeding point.

In the embodiment, the portion of the antenna connection conductor 34 in the vicinity of the feeding point is configured into a monopole antenna, i.e., the portion of the antenna connection conductor 34 in the vicinity of the feeding point is disposed in such a manner as to extend along the lengthwise direction (direction to be vertical at the time of communication) of the housing, and work as a monopole antenna. The antenna connection conductor 34 configured into the monopole antenna is hybrid together with a built-in antenna. That is, the linear antenna elements 43b, 43c and the antenna connection conductor 34 constitute a hybrid antenna.

Accordingly, the portion configured into the monopole antenna contributes to transmission and reception of a vertical polarization component, thereby increasing the gain of a vertical polarization component.

In portable wireless communication apparatuses like cellular phones, generally, a quarter-wave antenna whose electrical length is a quarter of a wavelength in a communication band is used.

Therefore, in the embodiment, the antenna connection conductor 34 (metal plate 34a thereof) and the linear antenna element 43b on the antenna board 43 work together, and function as a quarter-wave antenna.

Accordingly, the linear antenna element 43b itself on the antenna board 43 does not need to be quarter wavelength. Therefore, the antenna board 43 is miniaturized, and can be housed in a portion behind the hinge section 3 which cannot provide an enough space in the lengthwise direction of the first housing 1 (bottom casing 5).

As a result, a protrusive portion is not required on the hinge section side end portion, thereby miniaturizing the first housing 1.

As the antenna board 43 which has the linear antenna element 43b as the built-in antenna is miniaturized, the gain of a vertical polarization component is reduced. However, the gain of a vertical polarization component is complemented by the linear antenna element 43b on the antenna board 43 and the antenna connection conductor 34 which constitutes the hybrid antenna and is configured into the monopole antenna. Therefore, the gain of a vertical polarization component increases.

It is desirable that each of the electrical lengths of the linear antenna 43b (linear antenna for communication) on the antenna board 43 and the antenna connection conductor 34 should be one-eighth of a wavelength in a communication band, but functions well if it is approximately one-eighth. For example, even if the electrical length of the monopole antenna section is less than one-eighth of a wavelength in a communication band but is approximately one-eighth, it is possible to perform transmission and reception of a vertical polarization component well. That is, the gain of a vertical polarization component increases.

In the embodiment, a structure that the vibrator is disposed near the antenna connection conductor 34 is employed as illustrated in FIG. 3, but an affection from the vibrator 37 (more specifically, the affection of a electromagnetic wave which is emitted from the vibrator 37 when the vibration 37 operates and becomes a noise) is minimized as the antenna connection conductor 34 is bent in a direction away from the vibrator 37.

It is not illustrated in the figure, but in the metal plate 34a portion of the antenna connection conductor 34, a portion which connects the antenna board side connection terminal 34e and the circuit board side connection terminal 34c, i.e., the metal plate 34a portion running along the lengthwise direction of the first housing 1 (bottom casing 5) is molded in such a manner as to be located on a side away from the vibrator 37. Because of this structure, the antenna connection conductor 34 is also not likely to be affected by the vibrator 37.

As illustrated in FIG. 4, the antenna board side connection terminal 34e of the antenna connection conductor 34 disposed behind the hinge section 3 is disposed in such a manner as to be pulled toward the partition wall which divides off the hinge section 3 side and the interior of the first housing 1 (bottom casing 5), and is unlikely to be affected by the FPC 55.

Figure 8:
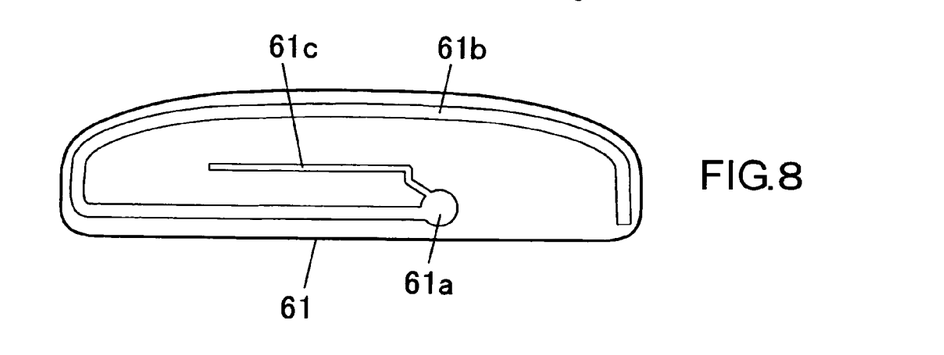
FIG. 8 is a plan view illustrating a modification of an antenna pattern.

FIG. 8 illustrates an modification of the antenna pattern.

As illustrated in the figure, an antenna board 61 is constituted by forming linear antenna elements 61b, 61c which extend from an electrode 61a for power feeding to the external side and the center by patterning copper films.

In the figure, an external thick linear antenna element 61b which extends from the left around the antenna board 61 is for communication. A central thin linear antenna element 61c which linearly extends toward the left is for GPS. Both of the linear antenna elements 61b, 61c are modified monopole antennas.

It is not illustrated in the figure, but the antenna board 61 integrally has a spring connector which protrudes from the feeding electrode 61a to the opposite side.

In the aforementioned embodiment, the explanation has been given of a case where the cellular phone is taken as an example of the foldable portable wireless communication apparatus, but the invention is not limited to this case, and may be applied to a laptop computer, a PDA (Personal Digital Assistance), and other portable wireless communication apparatuses having a wireless communication function.

A foldable portable wireless communication apparatus may be one that the first housing has at least a transmitter and the second housing has a receiver, or one that the first housing has an operation section and the second housing section has a display section.

In the embodiment, although a case where the antenna connection conductor is constituted by a resin molded metal plate is taken as an example, but a non-resin-molded metal plate or metal wires may be used.

The shape or the like of the antenna disposed behind the hinge section is arbitrary, and it is needless to say that other specific details and structures are changeable appropriately. For example, the antenna disposed behind the hinge section may be a linear antenna, and may be a wire antenna formed in an arbitrary shape like a helical antenna, an antenna which is a bent long and thin metal plate, as well as one which has an antenna pattern formed on a flexible board instead of a rigid board. In a case where an antenna pattern is formed on a flexible board by a copper film, a conductive material which connects the antenna pattern and a feeding point may be formed by a copper film pattern.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application claims priorities of Japanese Patent Application No. 2005-211695 filed on Jul. 21, 2005 and Japanese Patent Application No. 2006-88117 filed on Mar. 28, 2006, and the contents of which incorporated herein in their entirety.

What is claimed is:

1. A foldable portable wireless communication apparatus comprising:
a first housing having at least one of a transmitter and an operation section;
a second housing which has at least one of a receiver and a display section, and is rotatably linked with the first housing through a hinge section provided on one end portion of the first housing on a front face side thereof;
a first antenna element provided in an area which is a back of the hinge section inside the first housing;
a circuit board provided in an area not overlapping the hinge section inside the first housing, and having a radio-frequency circuit section mounted thereon; and
a connection conductor which connects the first antenna element and a high frequency wave input/output point of the radio-frequency circuit section on the circuit board, extends along a lengthwise direction of the first housing in the vicinity of the high frequency wave input/output point, and is so configured into a monopole antenna as a second antenna element, and constitutes a predetermined wave antenna together with the first antenna element.

2. The foldable-portable wireless communication apparatus according to claim 1, wherein the connection conductor constitutes a quarter-wave antenna together with the first antenna element.

3. The foldable portable wireless communication apparatus according to claim 1, wherein each of electrical lengths of the first antenna element and the connection conductor is approximately one-eighth of a wavelength in a communication band.

4. The foldable portable wireless communication apparatus according to claim 1, wherein the first antenna element is a meander antenna element.

5. The foldable portable wireless communication apparatus according to claim 1, wherein the first antenna element is a modified monopole antenna.

6. The foldable portable wireless communication apparatus according to claim 1, wherein the first antenna element is a thin planar antenna element.

7. The foldable portable wireless communication apparatus according to claim 1, wherein the first antenna element is formed on a printed board.

8. The foldable portable wireless communication apparatus according to claim 1, wherein the connection conductor comprises a metal plate.

9. The foldable portable wireless communication apparatus according to claim 8, wherein the metal plate is integrally molded with a resin by insert molding.

10. The foldable portable wireless communication apparatus of according to claim 1, wherein the connection conductor is separate from and connected to the circuit board and the first antenna element.

11. The foldable portable wireless communication apparatus of according to claim 1, wherein the connection conductor comprises a circuit board side connection terminal and an antenna board side connection terminal, the connection conductor being connected to the circuit board via the circuit board side connection terminal, and to the first antenna element via the antenna board side connection terminal.

* * * * *